US012665760B2

(12) United States Patent　　　(10) Patent No.:　US 12,665,760 B2
Kärkkäinen　　　　　　　　　　　　(45) Date of Patent:　Jun. 23, 2026

(54) METHODS AND ARRANGEMENTS FOR ENABLING SECURE DIGITAL COMMUNICATIONS AMONG A GROUP

(71) Applicant: Gurulogic Microsystems Oy, Turku (FI)

(72) Inventor: Tuomas Kärkkäinen, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 18/865,507

(22) PCT Filed: May 19, 2023

(86) PCT No.: PCT/FI2023/050281
§ 371 (c)(1),
(2) Date: Nov. 13, 2024

(87) PCT Pub. No.: WO2023/227828
PCT Pub. Date: Nov. 30, 2023

(65) Prior Publication Data
US 2025/0112771 A1　　Apr. 3, 2025

(30) Foreign Application Priority Data

May 25, 2022　(EP) ..................................... 22175341

(51) Int. Cl.
*H04L 9/30*　　　　(2006.01)
*H04L 9/08*　　　　(2006.01)
(52) U.S. Cl.
CPC .............. *H04L 9/30* (2013.01); *H04L 9/0825* (2013.01)
(58) Field of Classification Search
CPC ................................ H04L 9/30; H04L 9/0825
(Continued)

(56) References Cited

U.S. PATENT DOCUMENTS

2009/0222668 A1　9/2009　Zaccone et al.
2010/0329463 A1　12/2010　Ratliff et al.
(Continued)

FOREIGN PATENT DOCUMENTS

CN　　103688563 A　　3/2014
EP　　4283918 B1　　11/2023
(Continued)

OTHER PUBLICATIONS

European Patent Office, Communication under rule 71(3)EPC, Application No. 22175341.1, mailed Jan. 8, 2024, 8 pages.
(Continued)

*Primary Examiner* — Moeen Khan
(74) *Attorney, Agent, or Firm* — Ziegler IP Law Group, LLC.

(57)　　　　　　ABSTRACT

An arrangement for establishing a digital crypto group includes a cryptographic engine configured to produce cryptoproducts from given input data. The cryptographic engine responds to receiving, through a secure transport mechanism, requests containing user identifiers by producing a cryptoproduct. It also responds to receiving, through the secure transport mechanism, a subsequent second request containing one of the plurality of user identifiers by transmitting the cryptoproduct through the secure transport mechanism. The cryptoproduct is a digital crypto group that contains the plurality of user identifiers and a common cryptographic key for use in symmetric cryptography between users identified by the plurality of user identifiers and/or user-specific and user-identifier-related public keys for use in asymmetric cryptography in communications between users identified by the plurality of user identifiers.

17 Claims, 2 Drawing Sheets

(58) Field of Classification Search
USPC ......................................................... 713/171
See application file for complete search history.

(56) References Cited

U.S. PATENT DOCUMENTS

| | | | | |
|---|---|---|---|---|
| 2011/0320815 | A1 | 12/2011 | Matsunaka et al. | |
| 2015/0195261 | A1 | 7/2015 | Gehrmann et al. | |
| 2015/0281372 | A1 | 10/2015 | Wilson et al. | |
| 2019/0305940 | A1* | 10/2019 | Bhabbur | H04L 9/3226 |
| 2019/0312726 | A1* | 10/2019 | Sierra | H04L 63/104 |
| 2022/0069984 | A1 | 3/2022 | Ahn | |
| 2023/0103736 | A1* | 4/2023 | Liu | H04L 9/3247 |
| | | | | 713/171 |
| 2023/0136875 | A1* | 5/2023 | Tenny | H04W 76/14 |
| | | | | 370/329 |
| 2023/0216666 | A1* | 7/2023 | Harwood | G06F 11/3006 |
| | | | | 713/171 |

FOREIGN PATENT DOCUMENTS

| | | | | | |
|---|---|---|---|---|---|
| JP | 2004015495 | A | * | 1/2004 | ............ G06F 21/33 |
| JP | 2010100923 | A1 | | 5/2010 | |
| JP | 2014526171 | A | | 10/2014 | |
| KR | 20200055672 | A | | 5/2020 | |
| WO | 2023227828 | A1 | | 11/2023 | |

OTHER PUBLICATIONS

European Patent Office, Extended European Search Report, Application No. 22175341.1 mailed Nov. 17, 2024, 7 pages.

Finnish Patent and Registration Office, Written Opinion of the International Searching Authority, Application No. PCT/FI2023/050281, mailed Aug. 17, 2023, 10 pages.

Finnish Patent and Registration Office, International Search Report, Application No. PCT/ FI2023/050281, mailed Aug. 17, 2023, 5 pages.

Finnish Patent and Registration Office, Written Opinion of the International Preliminary Examining Authority, Application No. PCT/FI2023/050281, mailed May 30, 2024, 10 pages.

European Patent Office, Text Intended for Grant, Application No. EP 22175341.1, dated Jan. 8, 2024, 39 pages.

Australian Government IP Australia, Examination No. 1 for standard patent application, Application No. 2023274956, mailed Dec. 16, 2024, 3 pages.

China State Intellectual Property Office, First Notice of Review Observations, Application No. 202380038383.9, mailed May 1, 2025, 6 pages, English Translation, 6 pages.

Innovation, Science, and Economic Development Canada, Office Action, Application No. 3,249,415, mailed Jun. 26, 2025, 5 pages.

China State Intellectual Property Office, Search Report, Application No. 202380038383.9, mailed May 1, 2025, 2 pages, English Translation, 2 pages.

* cited by examiner

METHODS AND ARRANGEMENTS FOR ENABLING SECURE DIGITAL COMMUNICATIONS AMONG A GROUP

FIELD

The aspects of the disclosed embodiments concern generally the technical field of security needed in using digital services among a group of two or more parties. In particular, the aspects of the disclosed embodiments concern the task of centrally establishing trust among parties that may thereafter rely upon the centrally established trust in group communications or other kinds of group-related use of digital services.

BACKGROUND

Security in digital communications involves multiple aspects such as confidentiality (only authorized parties can access a piece of information), authentication (a communicating party must be sure who they are communicating with), integrity (a piece of information has not been unallowably modified), and non-repudiation (a party cannot successfully deny having sent a certain piece of information). A subgenus of digital communications is group communications, i.e. digital communications and/or the use of other digital services among the members of a predefined group. The members of the group should have access to the group-specific communications as easily and reliably as possible, while simultaneously ensuring that parties outside the group cannot access or otherwise interfere with the communications. Due to its inherent dependency on cryptographic applications, any group of the kind meant here may be called a digital crypto group.

At least two basic approaches are known for group communications. In a centralized solution, all communications between members of the group are routed through a server or a similar centralized service point. In such a case, the server may have considerable responsibility in authenticating the participants and performing the necessary encrypting and decrypting operations. The other approach is a distributed solution, in which communications may go directly between members. The distributed solution requires the user devices to have access to certain shared secret(s) to provide the required security.

Centralized solutions have at least the draw-back that they are completely dependent on continuous access to the server for all active members of the group. In distributed solutions, on the other hand, it has proven problematic to find a cost-effective and computationally reasonable way to distribute the shared secret. For example, in the known Diffie-Hellman method the parties must agree upon the order in which the public keys are provided for processing, in order to enable each party to calculate the shared secret common to the group. Also, many known distributed solutions are inefficient in ways of establishing a sufficient level of trust among the parties, which may make such solutions vulnerable to malicious attacks. Further drawbacks of many distributed solutions are related with their dependency on a particular technology in using the established digital crypto group. It would be better if the digital crypto group would be technology-agnostic, i.e. not dependent on any particular technology in relation to the ways in which the owner and members of the group plan to use it in the future.

A prior art document US 2019/0305940 A1 discloses a method in which, upon receiving a group credential request from a second user, a credential system checks with a public key of a first user that the request is legitimate before responding to the request by transmitting group credentials.

Another prior art document US 2015/0195261 A1 discloses methods in which a network node may create and join secure sessions for members of a group of network nodes.

Another prior art document US 2010/0329463 A1 discloses a method for group key management in a mobile ad-hoc network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide methods and arrangements for establishing, utilizing, and enabling the utilisation of a digital crypto group without the disadvantages of prior art outlined above.

According to a first aspect, there is provided an arrangement for establishing a digital crypto group. The arrangement comprises a cryptographic engine configured to produce cryptoproducts from given input data, and a receiving end and a transmitting end of a secure transport mechanism coupled to said cryptographic engine. Said cryptographic engine is configured to respond to receiving, through said secure transport mechanism, a first request containing a plurality of user identifiers by producing a cryptoproduct. Said cryptographic engine is configured to respond to receiving, through said secure transport mechanism, a subsequent second request containing one of said plurality of user identifiers by transmitting said cryptoproduct through said secure transport mechanism. Said cryptoproduct is a digital crypto group that contains said plurality of user identifiers and a common cryptographic key for use in symmetric cryptography between users identified by said plurality of user identifiers and/or user-specific and user-identifier-related public keys for use in asymmetric cryptography in communications between users identified by said plurality of user identifiers.

According to an embodiment, the arrangement is configured to check, whether said first request contained a respective user-specific encryption key for each of said plurality of user identifiers. The arrangement may then be configured to respond to a finding that said first request did not contain a respective user-specific encryption key for each of said plurality of user identifiers by augmenting the data received in said first request to contain a respective user-specific encryption key for each of said plurality of user identifiers. This involves at least the advantage that the arrangement can flexibly adapt to situations where not all user-specific encryption keys are included in the first request.

According to an embodiment, the arrangement is configured to perform said augmenting by requesting and receiving respective user-specific encryption keys from sources external to the arrangement. This involves at least the advantage that the arrangement can operate in and flexibly adapt to situations where it does not possess the missing user-specific encrypting keys by itself.

According to an embodiment, the arrangement is configured to check a piece of user-related information received in the first request against a corresponding piece of user-related information from another source, to find out whether these pieces of user-related information match each other. This involves at least the advantage that fraudulent or otherwise inappropriate use of user-related information can be detected and reacted upon.

According to an embodiment, the arrangement is configured to respond to a finding that said pieces of user-related information do not match each other by making a decision about whether the establishing of the digital crypto group is allowed to continue. This involves at least the advantage that the operation of the arrangement can be flexibly adapted to different kinds of needs concerning how accurate each piece of information must be.

According to an embodiment, the arrangement is configured to use a signing key to digitally sign information elements it includes in said crypto group. This involves at least the advantage that such information elements may carry special value as trusted information when used later.

According to an embodiment, the arrangement is configured to check from said subsequent second request whether the request is destined to itself or to a further recipient, and respond to a finding that the request is destined to a further recipient by forwarding said subsequent second request towards said further recipient. This involves at least the advantage that the same principles can be obeyed when operating in an environment where different users may belong to the administered domains of different trust providers.

According to an embodiment, the arrangement is configured to, prior to said forwarding, replace an original authentication of said subsequent second request with an authentication of the arrangement itself. This involves at least the advantage that the trust relationships between parties can be maintained and used appropriately even when information is forwarded further.

According to a second aspect, there is provided a method for establishing a digital crypto group. The method comprises receiving, through a secure transport mechanism, a first request containing a plurality of user identifiers and, as a response producing a cryptoproduct. The method comprises receiving, through said secure transport mechanism, a subsequent second request containing one of said plurality of user identifiers, and responding by transmitting said cryptoproduct through said secure transport mechanism. Said cryptoproduct is a digital crypto group that contains said plurality of user identifiers and a common cryptographic key for use in symmetric cryptography between users identified by said plurality of user identifiers and/or user-specific and user-identifier-related public keys for use in asymmetric cryptography in communications between users identified by said plurality of user identifiers.

According to an embodiment, the method comprises checking, whether said first request contained a respective user-specific encryption key for each of said plurality of user identifiers, and responding to a finding that said first request did not contain a respective user-specific encryption key for each of said plurality of user identifiers by augmenting the data received in said first request to contain a respective user-specific encryption key for each of said plurality of user identifiers. This involves at least the advantage that the method is flexibly adaptable to situations where not all user-specific encryption keys are included in the first request.

According to an embodiment, the method comprises, in producing said crypto group, using a signing key to digitally sign information elements included in said crypto group. This involves at least the advantage that the method is operable in and flexibly adaptable to situations where the arrangement executing the method does not possess the missing user-specific encrypting keys by itself.

According to an embodiment, the method comprises checking from said subsequent second request whether the request is destined to the arrangement executing the method or to a further recipient, and responding to a finding that the request is destined to a further recipient by forwarding said subsequent second request towards said further recipient. This involves at least the advantage that the same principles can be obeyed when operating in an environment where different users may belong to the administered domains of different trust providers.

According to an embodiment, the method comprises, prior to said forwarding, replacing an original authentication of said subsequent second request with an authentication of the arrangement executing the method. This involves at least the advantage that the trust relationships between parties can be maintained and used appropriately even when information is forwarded further.

According to a third aspect, there is provided a computer program product comprising one or more sets of one or more machine-executable instructions that are configured to, when executed by one or more processors, make said one or more processors execute a method of a kind described above.

DETAILED DESCRIPTION

Figure 1:
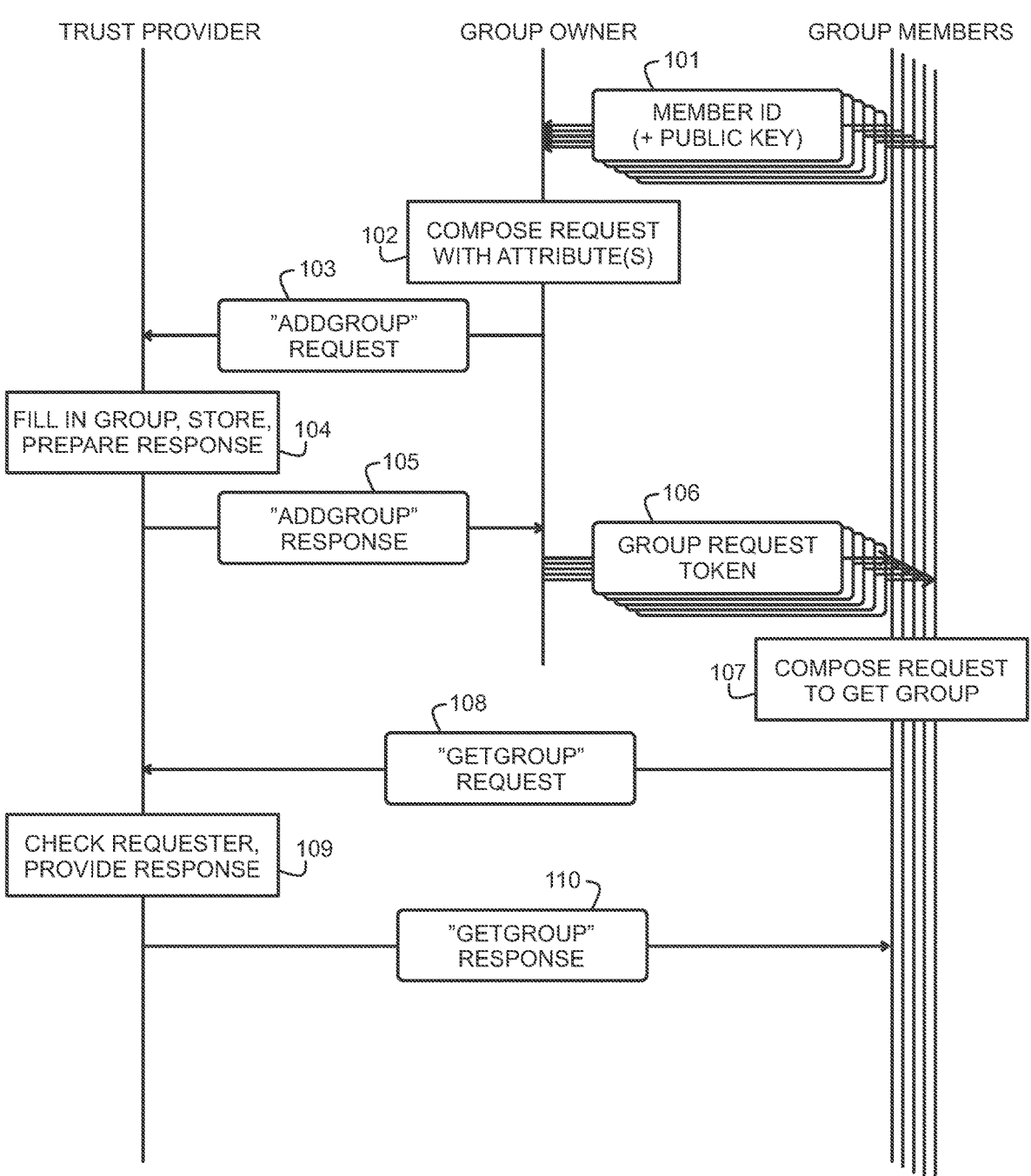
FIG. 1 illustrates exchange of information when operating in accordance with an embodiment.

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

An example of a digital crypto group is a group of at least two users, for example (but not necessarily) individual persons, who wish to share digitally transmitted information between each other securely, i.e. so that everyone in the group can trust the others to be who they appear to be and so that parties who are not members of the group cannot access the shared information. One of said users may act as an owner or founder of the group.

Another example of utilizing a digital crypto group is one the purpose of which is to enable an individual user to securely possess a digital attribute and to present it for checking when needed. For instance, a national authority responsible for granting driving licenses may set up and administer such a group per each holder of a valid driving license. A police officer may be taken as a (preferably temporary) member to such a group, in which case the officer would have the means for conducting secure digital communications with a digital wallet of the user. The right of the user to drive a particular kind of a vehicle may have been stored as an attribute, which the user's digital wallet may then present to the police officer for inspection. As another example, the owner of the group may be a commercial enterprise and the members may be a user who owns a loyalty card and his or her family members, who in prior art systems appeared as owners of subordinate cards associated with that of the main user.

In the general definition used in this text, the owner or founder of a digital crypto group is not necessarily a member of the group despite having said role as an owner or founder. The situation may be visualized with the concepts of right to read and right to write. The members of the digital crypto group have always the right to read; in other words, they have continuous access to attributes that have been stored for the group as long as they remain members. While the owner has the right to write, i.e. the right to decide what attributes will be stored for the group, after setting up the group the owner does not necessarily have later access to the stored attributes or communications between the members. In many cases, however, it may be most practical that the owner becomes also a member of the group.

Members of a digital crypto group may be users, but at least in some cases also organisations and/or devices. In those cases where the members are users, it is customary to refer to them as members of the group (and also to the group owner as such) even if in the strict sense the parties that take place in actual digital communications are electronic devices operated by said users and the group owner. Such an electronic device may be for example a computer, a laptop, a tablet, a smartphone, a portable digital assistant, or some other electronic device that comprises the required means for processing and communications. In some cases, a programmable, implantable electronic device of a user may act as such an electronic device.

All references to a device in singular are meant to cover also groups of two or more devices working together under the supervision of the same user. Such a group of two or more devices may be described as consisting of devices that the user has linked together. The concept of Self-Sovereign Identity (SSI) is taken to imply that a user has cryptographically established control over the information generated into the group, including rights like right to manage, right to handle, and the like. Cryptographically established control differs from rights that would be simply based on some stored rights bound to a certain user ID: it means that the user possesses the cryptographic elements that are necessary to read and/or write the appropriate information. Establishing crypto groups aims at providing the members of the group with such possession of necessary cryptographic elements.

FIG. 1 illustrates some communications between—and some operations performed by—a trust provider, a group owner, and one or more group members when executing a method according to an embodiment. The trust provider may also be called the vault, emphasizing the assumption that it represents an institution with exceptionally high level of digital security. Similar designations, which also could be used for the trust provider, are wallet provider and the acronyms CA and/or VA (Certification Authority, Validation Authority). The trust provider may be privately operated, or it may belong to and/or operate under the supervision of an authority.

In order to begin setting up a group, the group owner should possess at least some means for digitally identifying each member of the group to be formed. More members may be added to a group later, but here the case of setting up a group for a predefined number of known users will be considered first. Concerning new members to be added later, it should be noted that adding a new member to a previously existing group may mean that the new member will get access also to information that has been processed in the group before adding the new member. Previously processed information can be kept out of access to new members by separately encrypting it within the group, or by encrypting it with keys exchanged between old members of the group, like so-called PGP keys of which the old members may have distributed their public keys to each other while keeping the secret keys to themselves. Yet another possibility is to encrypt the old information only once with a key known to the old members, and separately encrypting said key to each old member. This last possibility may be the most cost-effective one, because the amount of information shared within the group does not grow proportionally to the number of members; each old member just needs to securely store their own key to the encrypted information within the group. If a new member categorically need not (or should not) get access to information processed earlier, it may be more straightforward to set up a new group to which also the new member belongs. Existing group members may also be later removed from a group; this typically necessitates updating at least some of the keys that are used for secure handling of information related to the group.

FIG. 1 shows schematically a step 101 in which the users communicate to the group owner the identifiers by which they wish to be known in the group. It is to be noted, however, that for the purposes of the following description it is meaningless, how and when the group owner acquired the member IDs or other identifiers of the group members. If the group owner maintains e.g. a contact information catalogue, an official register of population information, or a customer database, it may read the identifiers of the group members from there. As there may be i members in the group, where i is a positive integer used as an index, the user identifier(s) of the group member(s) may be generally referred to as $UID_i$.

At step 101 (or at any other, previous step) the group owner may also acquire, from each member of the group to be set up, a respective public key that constitutes one half of a user-specific key pair of an asymmetric cryptography system. This is, however, not necessary as public keys of the group members may come into play also later, as will be described later in this text. The public key of the i:th member in the group may be referred to as $PK_{UIDi}$.

At step 102, the group owner composes an AddGroup request, i.e. a request for setting up the digital crypto group. The AddGroup request will be directed to the trust provider, and it should contain at least the identifiers of the group members as well as one or more attributes that are intended for future use by the group members. As an example of an attribute, a pre-shared key (PSK) called $P_{GO}$ is considered here. Such a PSK may be meant for use as a shared secret among the group members, for example as an encrypting and decrypting key of a symmetric cryptography method. The PSK and/or other attributes will be handled as a part of a data structure called the Keystore Group Archive, known by its acronym KGA. According to a formal designation, there is $$KGA(P_{G0}, \ldots)$$

where the three periods show that the KGA may contain also other attributes, like the identifiers $UID_i$ of the group members and/or public keys $PK_{UIDi}$ of (at least some of) the group members. If these are to be explicitly listed, the formal designation may be $$KGA(P_{G0},UID_i,PK_{UIDi}, \ldots).$$

Examples of possible other attributes in the KGA include, but are not limited to: name and/or other identifier of the digital crypto group, timestamps to show e.g. creating and modifying times of the digital crypto group, expiration data to show how long the digital crypto group should remain valid, identifier of the trust provider to whom the request will be directed, and metadata pertinent to any aspect(s) of the digital crypto group.

For security, step 102 should comprise encrypting the KGA. An advantageous way of generating an encryption key $K_{KGA}$ is $$K_{RGA}=SHA2(X25519(SK_{UID},PK_{VID})\\ \|PK_{VID}\|PK_{UID}\|n)$$

where SHA2 ( ) denotes performing the Secure Hash Algorithm 2 performed on the argument in parentheses and X25519 ( ) denotes applying the Curve25519 Elliptic Curve Diffie-Hellman method on the argument in the parentheses. The letter n denotes a cryptographic nonce, for example a unique nonce of 12 bits. The double vertical line‖means a bitwise logical OR operation. The keys $PK_{VID}$ and $PK_{UID}$ are the public keys of the trust provider ($PK_{VID}$) and the group owner ($PK_{UID}$) respectively.

The encrypting of the KGA may be performed for example using the AES256-GCM method, meaning 256-bit AES on Galois/Counter Mode. Using the notation introduced so far, the encrypted KGA may be represented as $$Enc(K_{KGA},KGA(P_{G0}, UID_i, PK_{UIDi}, \ldots ))=AES256-\\ GCM(SHA2(X25519(SK_{UID},PK_{VID})\\ \|PK_{VID}\|PK_{UID}\|n),m,n,KGA (P_{G0},UID_i,\\ PK_{UIDi}, \ldots ))$$

where the letter m denotes a MAC or message authentication code for the encryption authentication tag.

In addition, it is advantageous to have step 102 comprise the generation of a pair of ephemeral keys of an asymmetric cryptography method. These ephemeral keys are here called $PK_{GRT}$ and $SK_{GRT}$, where PK means a public key, SK means a secret key, and the subscript GRT comes from the words Group Request Token. The group owner will keep the secret key $SK_{GRT}$ stored and provide the public key $PK_{GRT}$ to the trust provider in the AddGroup request. This way the trust provider can use the public key $PK_{GRT}$ to encrypt its eventual response, ensuring that only the group owner will be able to decrypt it. The ephemeral nature of these keys is not obligatory, but it adds security because a malicious party who would later get hold of any of these keys would have little use of it.

Transmitting the completed AddGroup request from the group owner to the trust provider is shown as step 103 in FIG. 1. The designation AddGroup and all other specific designations in FIG. 1 are exemplary only and should not be construed limiting in any sense; naturally, some other name could be used for the message. It is also not necessary to convey all information described here in a single message, but multiple transmissions through either a common communications channel or even a plurality of channels could be used. Using the notations introduced above, the AddGroup request at step 103 may contain at least the ephemeral public key $PK_{GRT}$ and the encrypted KGA.

A secure transport mechanism is most advantageously used for conveying the AddGroup request from the group owner to the trust provider at step 103. A non-limiting example of such a secure transport mechanism is a digital communications channel in which the TLS (Transport Layer Security) protocol can be used. The arrangement referred to here as the trust provider comprises a receiving end and a transmitting end of such a secure transport mechanism, coupled to a cryptographic engine capable of performing cryptographic operations. Reception and transmission through the secure transport mechanism do not necessarily go through the same or similar channel or connection, although that is not excluded either.

Step 104 in FIG. 1 could be generally characterized as the trust provider setting up the requested digital crypto group and storing it in the form of a data structure that can later be communicated to the members of the group upon request. Step 104 could also be characterized so that the cryptographic engine in the trust provider's arrangement responds to receiving, through said secure transport mechanism, a first request (i.e. the AddGroup request 103) containing a plurality of user identifiers (the $UID_i$) by producing a cryptoproduct. Here the word cryptoproduct refers to the digital crypto group, which contains at least the user identifiers of the group members as well as a key or keys for enabling secure communications between the group members. The digital crypto group may also contain a variety of other information, as will be described in more detail later in this text.

As the KGA came in the AddGroup request 103 in encrypted form, the trust provider's arrangement should decrypt it first. Assuming that the group owner used the method described above for generating the encryption key for encrypting the KGA in the AddGroup request 103, the trust provider's arrangement can regenerate the key as $$K_{KGA}=SHA2(X25519(SK_{VID},PK_{UID})\\ \|PK_{VID}\|PK_{UID}\|n)$$

and use the regenerated key to decrypt the KGA.

Above, it was already pointed out that when constructing the AddGroup request 103, the group owner does not necessarily have the user-specific (public) encryption keys of all (or even any of the) group members in its possession. For this reason, it is advantageous to configure the trust provider's arrangement to check, as a part of step 104, whether the received AddGroup request 103 contained a respective user-specific encryption key for each user identifier. If not, the trust provider's arrangement may be configured to augment the data received in said first request to contain a respective user-specific encryption key for each of said plurality of user identifiers.

One possibility is that the trust provider already knows the respective user-specific (public) encryption keys, for example based on some previous communications it has had with said users. As another possibility, the trust provider's arrangement may be configured to perform said augmenting by requesting and receiving respective user-specific encryption keys from sources external to the arrangement. As an example, one may consider a case in which there are two or more trust providers linked with each other. Each such trust provider has a database of users previously known to it: the trust providers may be for example different authorities with whom certain users have communicated before, and/or different commercial enterprises each having their own customer database. User-specific encryption keys, in particular public keys, may appear routinely stored in such databases, each such stored encryption key having an unambiguous relationship to a respective user identifier of similar kind as those used in the AddGroup request. The trust provider's arrangement may send requests to one or more such linked trust providers and acquire the requested user-specific encryption keys in response.

A similar principle can be applied also concerning other data to be included in the crypto group: the trust provider's arrangement may augment the contents-to-be of the crypto group by generating any missing information elements, either by its own or by requesting from linked other sources, or both. The trust provider's arrangement performs any such augmenting, if needed, in accordance with the predefined specifications that govern the creating and handling of crypto groups.

The trust provider's arrangement may be configured to check any piece of information, for example user-related information, received in the AddGroup request 103 against a corresponding piece of (user-related) information from another source. If executed, the purpose of such a check is to find out whether these pieces of user-related information match each other. For example, if the AddGroup request 103 contained one or more user-specific (public) encryption keys, the trust provider's arrangement may compare these to its own database or—if not found in its own database—it may again make requests to possibly linked other trust providers, much like in the case of requesting the user-specific encryption keys above.

Each user (or other party eligible for a membership in a group) may be assumed to "belong" to, or to have been originally securely identified by, some trust provider. The trust provider whose arrangement received the AddGroup request 103 may not be the one who originally securely identified all those users who are to be included as members to the new group. In other words, the AddGroup request 103 may contain the UID of one or more intended members of the group who "belong" to one or more different trust providers than the one whose arrangement received the AddGroup request. In such a case, one possibility is that the trust provider's arrangement simply leaves an empty space where it would use the user-specific encryption key if one of its "own" users would be in question. Such a way of operating, i.e. leaving the user-specific encryption key of a "foreign" user empty, may have certain further consequences that are described later in this text.

If said pieces of user-related information do not match each other, the trust provider's arrangement may make a decision about whether the establishing of the digital crypto group is allowed to continue. Both positive and negative decisions are possible, depending on how the trust provider's arrangement has been programmed to operate and what kind of decision criteria it applies.

Above, it was already pointed out that in addition to the user identifiers, the digital crypto group when completed should contain a key or keys for enabling secure communications between the group members. The user-specific (public) encryption keys may fulfil this requirement, because each user can be assumed to have the corresponding secret key securely stored. Another example of such a key is the pre-shared key (PSK) called $P_{G0}$ above, generally defined as a common cryptographic key for use in symmetric cryptography between users identified by the user identifiers. If the group owner generated the $P_{G0}$ already, the trust provider's arrangement may simply read it from the decrypted KGA and store it as a part of the digital crypto group. As another alternative, the trust provider's arrangement may generate such a PSK and store it as a part of the digital crypto group.

The $P_{G0}$ or other PSK is an example of an attribute (or information element) included in the crypto group that the group members must be able to completely rely upon later. In order to provide such security, it is advantageous to have the $P_{G0}$ or other PSK digitally signed by the group owner (if the group owner generated the $P_{G0}$ already) and/or by the trust provider's arrangement. According to known principles, a signing party uses its secret signing key for digital signing, so that other parties can later verify the integrity of the information element in question using a corresponding public verifying key of the signing party.

In order to provide additional security in subsequent stages of the method, it is advantageous to configure the trust provider's arrangement to generate, as a part of step 104, a further pair of ephemeral keys of an asymmetric cryptography method. This pair of ephemeral keys will be referred to here with the subscript GAT, meaning Group Access Token. As a non-limiting example, the trust provider's arrangement may generate a secret GAT key $SK_{GAT}$ as $$SK_{GAT} = \text{RNG}(256)$$

where the operator RNG( ) means generating a random binary number with as many bits as the (decimal base) number in the parentheses. The corresponding public key $PK_{GAT}$ may then be generated for example as the public key from scalarbasemult ($SK_{GAT}$). Here, scalarbasemult( ) is a function which, based on an elliptic curve such as Curve 25519 for example, deterministically returns a corresponding public key when given a secret key as an input. The name of the function may change depending on the source used, but at the time of writing this text the documentation concerning the original scalarmult( ) function may be found at https://doc.libsodium.org/. Whenever a pair of secret and public keys need to be generated, this can also be done using a suitable single function that gives both keys as outputs.

The trust provider's arrangement may be configured to encrypt the created or updated KGA in a slightly different way depending on whether this was the case of creating this digital crypto group before transmitting a response to the group owner (or a case of updating a previously created digital crypto group, however before communicating with any of the other group members) at step 104 or whether the encrypting is done in association with communicating with a group member other than the group owner; see step 109 in FIG. 1. In the first-mentioned case, an advantageous possibility is to utilize a previously obtained key specific to the group owner. An advantageous method of creating and handling such a key has been described in the co-pending patent application number EP22157019.5, which is not available to the public at the filing date of this text. The key in question is called $SK_{UAT}$ in said method, where the subscript UAT comes from User Access Token. The process of encrypting the newly created KGA may involve generating a shared secret $SS_{GAK}$ as $$SS_{GAK} = \text{scalarmult}(SK_{GAT}, PK_{GRT})$$

where the subscript GAK comes from Group Archive Key. The function scalarmult( ) is a function which, based on an elliptic curve such as Curve 25519 for example, returns the computationally shared secret between two parties, making it unnecessary to transmit an actual key while relying upon the security established by mathematically linked key pairs. The newly created KGA may then be encrypted as $$\text{Enc}(SS_{GAK}, KGA(\dots))$$

where the three periods again generally represent all information that is included in the KGA. If the case was one of updating a KGA that was previously encrypted with the $SS_{GAK}$ as key, however before communicating with any group member other than the group owner, the updating operation may be described as $$\text{Update}(\text{Dec}(SS_{GAK}, KGA(\dots)))$$

after which the new encrypting may take place similarly as above.

If the encrypting is done as a part of step 109, in association with communicating with a group member other than the group owner, added security can be obtained by utilizing the secret GAT key $SK_{GAT}$ introduced earlier in this text. In that case, a shared secret $SS_{GAK}$ may be obtained as $$SS_{GAK} = \text{scalarmult}(SK_{GAT}, PK_{GRT})$$

where the subscript GAK comes from Group Archive Key. The KGA may then be encrypted as $$\text{Enc}(SSG_{AK}, KGA(\dots))$$

Storing the KGA at the trust provider's arrangement this way, in a form encrypted with the $SS_{GA}K$, serves the purpose that a key coming from a source external to the trust provider is always needed to decrypt the stored KGA. Thus, even if security at the trust provider was compromised and the stored KGAs got exposed, they would be of little use to the attacker because not even the trust provider can access their encrypted contents without those key components that must come from the group owner or one of the other group members.

As a result of the procedural steps explained above, KGA (i.e. the cryptoproduct that the cryptographic engine of the trust provider's arrangement produced at step 104) may be described for example as $$KGA(P_{G0}, UID_i, PK_{UIDi}, PID, GID, GMD, \dots)$$

where $P_{G0}$ is the PSK for the group, $UID_i$ marks the group members (including the group owner) listed by their identifiers, $PK_{UIDi}$ marks the (public) user-specific encryption keys of the group members, PID or Provider ID is a public identifier of the trust provider, GID or Group ID is a public identifier of the group, and GMD or Group MetaData marks all possible metadata associated with the group. An identifier and/or a public key of the group owner may be singled out to allow distinguishing it or them from the rest of the $UID_i$ and $PK_{UIDi}$.

In order to enhance trustworthiness of the attributes in the crypto group, it is advantageous to configure the trust provider's arrangement to use a signing key at its possession to digitally sign information elements it includes in the crypto group. This enables all members of the group to later ensure that attributes read from the crypto group are correct, i.e. their originality and integrity has not been compromised.

The step where the trust provider's arrangement transmits the AddGroup response to the group owner is shown as step 105 in FIG. 1. Comparable to the AddGroup transmission earlier at step 103, the trust provider's arrangement advantageously encrypts the KGA before transmitting it to the group owner in the AddGroup response 105. An advantageous form of such encryption is $$\text{Enc}(K_{KGA}, KGA(\dots)) = \text{AES256-GCM(SHA2}$$
$$(X25519(SK_{VID}, PK_{UID}) \| PK_{VID} \| PK_{UID} \| n), m, n,$$
$$KGA(\dots))$$

After step 105, the group owner has all necessary information about the group, including the augmented information that the trust provider provided of its own motion and/or requested from linked other trust providers or other sources during step 104. Additionally, the group owner knows that all necessary information about the group is securely stored in the trust provider's arrangement, and ready to be distributed from there to the members of the group.

Step 106 represents the group owner instructing the group members to contact the trust provider and download the KGA from the trust provider's arrangement. One advantageous way for enabling the group members to do so is to send them copies of the Group Request Token, i.e. the ephemeral public key $PK_{GRT}$. Additionally or alternatively, the group owner may send other information about the group to the group members at step 106.

The rest of the steps shown in FIG. 1 are shown with respect to one group member only in order to maintain graphical clarity. Similar steps should be executed with respect to all group members to make the group fully operational. However, even if one or more group members fail to do their part, those members of the group who have completed the execution of the corresponding steps may already utilize the group. Here it may be noted that certain advantages may be gained by using the trust provider as a secure storage of information elements related to the group even if only one member of the group would actually perform these steps and utilize the crypto group in the future.

Step 107 represents the group member composing a request to acquire the necessary information concerning the group, and step 108 represents the group member transmitting the request, called here the GetGroup request, to the trust provider. The transmission at step 108 is comparable to the transmission at step 103 earlier in that it may utilize a secure transport mechanism like a digital communications channel in which the TLS (Transport Layer Security) protocol can be used.

The GetGroup request 108 should allow the trust provider to ensure that the sender, i.e. the group member, is one of those who are allowed to receive the KGA needed to operate as a member of the group. Advantageously, the GetGroup request 108 therefore contains at least a user identifier UID, which the trust provider may then compare to the list of user identifiers $UID_i$ it received previously from the group owner. One advantageous way of making the GetGroup request 108 contain the user identifier UID is to make it contain a certificate of the requesting party, which certificate contains both the UID and a public key of the requesting party. In such a case, the trust provider may use the UID for the purpose mentioned above and the public key for protecting the KGA that it will send as a response to the requesting party.

Additionally, the GetGroup request 108 advantageously contains the Group Request Token, i.e. the ephemeral public key $PK_{GRT}$. Other possible information elements that the GetGroup request may contain, at least if the requesting group member previously obtained them from the group owner, include but are not limited to the group identifier GID, a reference to the identifier of the group owner, various type of signed or unsigned attributes, and/or any metadata related to the group.

Step 109 in FIG. 1 represents in general all checks that the trust provider's arrangement is configured to make in response to receiving the GetGroup request 108. Basically, the cryptographic engine in the trust provider's arrangement is configured to respond to receiving, through said secure transport mechanism, the GetGroup request 108 (which contains one of the plurality of user identifiers previously received in the AddGroup request 103) by transmitting the previously produced cryptoproduct, i.e. the digital crypto group, through the secure transport mechanism.

Taken that the KGA got previously stored in encrypted form in the trust provider's arrangement, the arrangement may first regenerate the key $SS_{GAK}$ needed for decrypting as $$SS_{GAK}=\text{scalarmult}(SK_{GAT},PK_{GRT})$$

and then perform the decryption $$\text{Dec}(SS_{GAK},\text{KGA}(\dots)).$$

The arrangement may then proceed to encrypt the KGA again, this time for transmission to the requesting group member, by providing $$n=\text{RNG}(96)$$

as a nonce and $$K_{KGA}=\text{SHA2}(X25519(SK_{VID},PK_{UID}) \\ \|PK_{VID}\|PK_{UID}\|n)$$

as an encrypting key (using the $PK_{UID}$ of this particular user, read from the certificate if one was received in the GetGroup request), and then encrypting $$\text{Enc}(K_{KGA},\text{KGA}(\dots))=\text{AES256-GCM}(\text{SHA2} \\ (X25519(SK_{VID},PK_{UID})\|PK_{VID}\|PK_{UID}\|n),m,n, \\ \text{KGA}(\dots)).$$

From the viewpoint of security, it is particularly advantageous to require the certificate mentioned above to always come from the requester, because at step 109 (and later at step 210 in FIG. 2) the Keystore Group Archive is secured for the user against the particular user's public key $PK_{UID}$. The certificate may come in the GetGroup request as mentioned above, but it may also have come to the knowledge of the trust provider's arrangement through some other PKI-based solution, for example in accordance with a method described in a co-pending European patent application EP22157019.5 of the same applicant. Additionally or alternatively, if an appropriate intelligent identity card, passport, or corresponding document is present, the trust provider's arrangement may read the certificate therefrom as an RSA or ECC certificate according to the specification X.509.

Similarly from the viewpoint of security, it is highly advantageous to require the certificate to be signed by the trust provider's arrangement or—in the case of several, mutually linked trust providers—by an arrangement of one of such mutually linked trust providers. Any party who then receives a certificate may check the integrity and authenticity of the certificate and ascertain that it was signed by a trustworthy party (i.e. by the trust provider or one of the mutually linked trust providers). This in turn proves that the public key contained in the certificate can be relied upon.

Of the nonce n it may be noted that it is related to the requirements of the AES-256 GCM algorithm accepted by the IETF. It provides 32 additional bits of enhanced security to the encrypting key, in particular when it is in use for a longer time, up to a maximum of 350 GB.

Step 110 in FIG. 1 represents the trust provider's arrangement transmitting the encrypted KGA to the group member who requested it. The transmission is labelled GetGroup response in FIG. 1, to emphasize its association with the preceding GetGroup request 108. Similarly to the designation AddGroup earlier, the designation GetGroup is naturally just an example, and other designations could be used.

As an example of applying a method of the kind shown in FIG. 1, one may consider a situation in which a police officer on a routine patrol stops a citizen and wants to check the citizen's right to drive that particular kind of a vehicle. The national authority responsible for granting driving licenses may act as the group owner. Already previously, at the time of granting the presently valid driving license, the authority may have formed a digital crypto group where it is itself the group owner and the citizen is a member. In forming the group, the authority may have communicated the allowed vehicle types as attributes to the trust provider and asked the trust provider to digitally sign these attributes. When the citizen then joined the group by sending a corresponding GetGroup request, the digitally signed attributes became stored in a "digital wallet", i.e. a dedicated storage location in the citizen's user device. The attributes may remain valid for as long time as the basic document (in this example: the driving license) remains valid.

Having learned the (public) user identifier from the citizen, the police officer may send a request to the authority, giving their own user ID (and possibly public key) and also adding the user identifier of the citizen as an attribute to the request. The authority may then send an AddGroup request to the trust provider, essentially requesting the police officer to be temporarily added to the previously formed digital crypto group with a right to receive an attribute "allowed vehicle types" from the citizen. As an alternative, the police officer (or the police force as an institution, with corresponding derived rights for individual officers when they are on duty) may have been made a (permanent or at least long-term) member of the group already earlier, in order to allow inspecting the citizen's driving license also offline.

The trust provider's arrangement may perform the requested addition to the digital crypto group. An indication thereof will then reach the police officer's user device, containing the Group Request Token. When the police officer's user device then sends a GetGroup request to the trust provider, it eventually receives a GetGroup response containing the information it needs. During this round of communications, one or more attributes may have been added to the digital crypto group: for example time-bound validity information that only allows the police officer's user device to remain a member of the group for a short period of time.

Once the police officer became a member of the digital crypto group, the user devices of the citizen and the police officer may enter into local communications in which the citizen's user device presents the previously obtained, digitally signed attribute "allowed vehicle types" to the police officer's user device. Due to the digital signature, the latter is able to verify that the presented attribute is valid. When all checks are completed, the police officer's user device may be removed from the digital crypto group through a similar round of communications as when it was added, or one may simply rely on the previously mentioned time information to allow the membership of the police officer in the digital crypto group to expire. As a further alternative there is the permanent or at least long-term membership of the police in the group.

In an example case like that above, the authority may want to regularly update the attributes of the crypto group, in order to ensure that no outdated attributes (or at least not badly outdated attributes) remain stored in the devices of users. The citizen's user device may fetch the updated crypto group from the trust provider, following the known schedule of updates and/or when prompted to do so by the authority.

Figure 2:
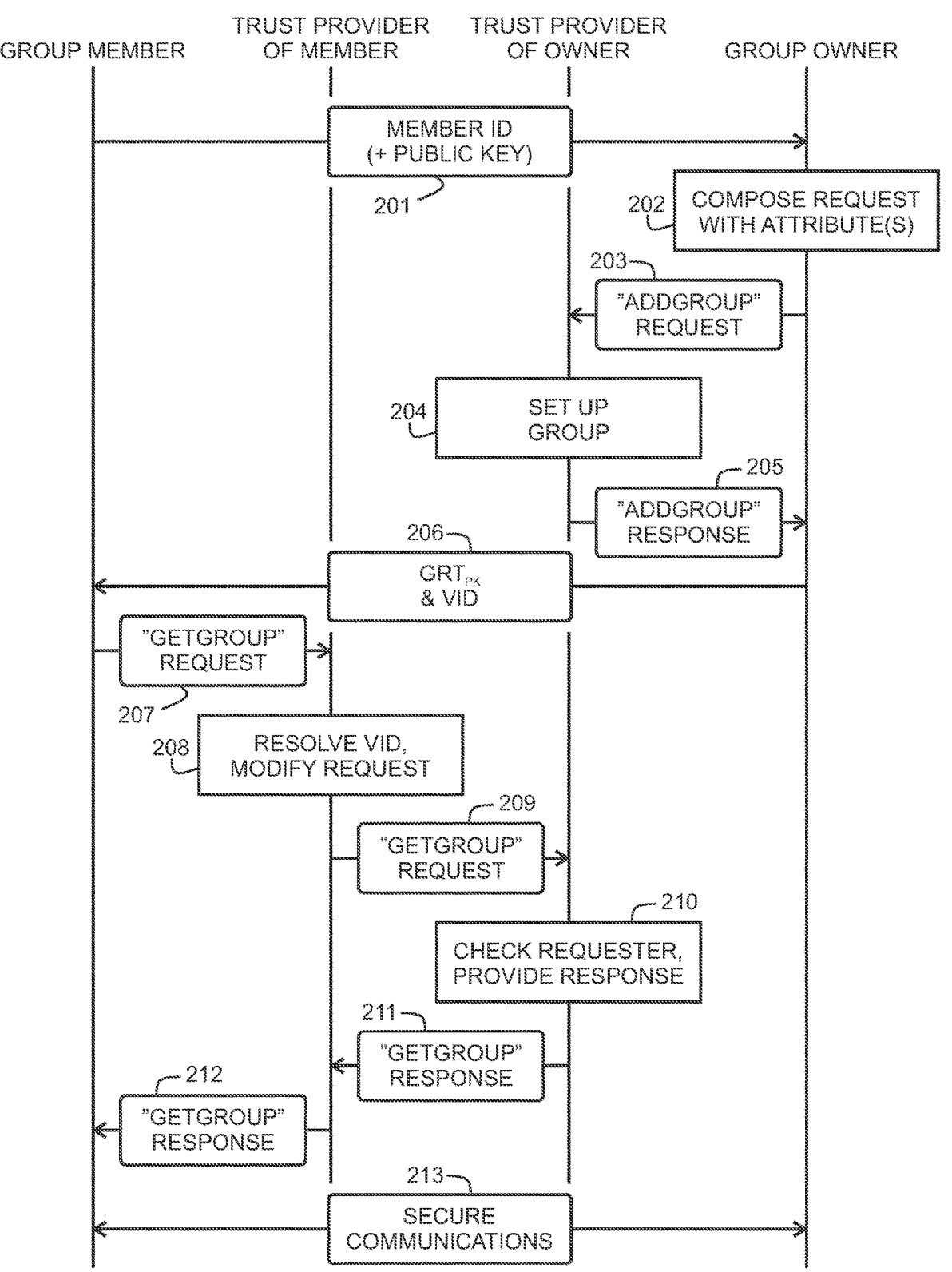
FIG. 2 illustrates exchange of information when operating in accordance with an embodiment.

FIG. 2 illustrates some communications between—and some operations performed by—two trust providers, a group owner, and a group member when executing a method according to an embodiment. As a background to this embodiment, one may recall the assumption that each user may "belong" to their selected trust provider. In this example, the two vertical lines in the middle represent the arrangements of the trust providers and the two vertical lines on the right and left represent the group owner and the group member accordingly. For the purpose of illustration, the example shown in FIG. 2 may be considered as relating to a practical use case in which the group owner wants to set up a protected phone call to the group member.

Step 201 in FIG. 2 is comparable to step 101 in FIG. 1 in that the group owner should have acquired an identifier of the group member in some way or another. This step may have taken place even a very long time earlier, as is typical to for example users who store each other's telephone numbers in their user devices.

Step 202 is also comparable to the corresponding step 102 in FIG. 1 in that it represents the group owner's user device performing steps that aim at setting up the protected call, i.e. at creating a crypto group within which the protected call may take place. The composed request is shown as step 203 and named an AddGroup request, much like in step 103 of FIG. 1. The group owner transmits the AddGroup request 203 to their "own" trust provider. Most advantageously, the AddGroup request 203 contains the encrypted KGA (Key-store Group Archive) and the Group Request Token PK$_{GRT}$, of which the KGA contains, among others, a pre-shared key (called PSK or P$_{G0}$ earlier in this text) and an identifier UID (and possibly a public key PK$_{UID}$) of the group member to which the protected call should be made.

Step 204 in FIG. 4 is comparable to step 104 in FIG. 1 in that it represents the trust provider (the one to which the group owner "belongs") setting up the requested crypto group and storing it in the form of a data structure that can later be communicated to the group member upon request. A cryptographic engine in this trust provider's arrangement responds to receiving, through a secure transport mechanism, the AddGroup request 203) containing a plurality of user identifiers (the UIDs of the group owner and the group member) by producing a cryptoproduct, i.e. by creating the requested crypto group. Step 205 is the AddGroup response that the trust provider's arrangement transmits back to the group owner, again much like step 105 in FIG. 5.

At step 206 the user device of the group owner transmits to the user device of the group member at least the Group Request Token PK$_{GRT}$ and the identifier VID of the group owner's trust provider. Although not explicitly shown as a separate step in FIG. 2, the user device of the group member uses this information to compose a request to get the (encrypted KGA of the) crypto group. However, as the group member belongs to a different trust provider than the group owner, the GetGroup request of step 207 is not transmitted to that trust provider that currently holds the stored data of the crypto group. Instead, the user device of the group member transmits the GetGroup request 207 to its own trust provider.

The pre-existing relationships between users and their trust providers mean that it is particularly easy and straightforward for their corresponding devices and arrangements to set up and utilise the secure transport mechanisms that are used to transmit the requests and responses shown in FIG. 2. At some previous phase, enough keys and/or other shared secret information may have been exchanged between each user and their respective trust provider so that these communication connections are both fast and secure to set up when needed. The same applies to communications between trust providers. As such, relying on shared secrets as meant here is agnostic to the technology used to establish them. Just like the PKI (Public Key Infrastructure), it is not important what kind of encrypting (ECC, RSA, or other) and algorithms are used. It is reasonable to assume that for example authorities may often rely upon older encryption technologies than the most advanced individual users and private enterprises, so in the most advantageous case the system and method should allow operating with any kinds of PK keys.

The reference to shared secrets above may advantageously mean the computational secret between mathematically linked key pairs, which comes from the product of one's own secret key (SK) and the other's public key (PK) according to e.g. the ECC or RSA algorithms.

At step 208 the trust provider of the group member receives the GetGroup request 207 and notes that it contains, in addition to the Group Request Token, an external VID. In other words, the VID in the GetGroup requests 207 is not that of the group member's trust provider but identifies the group owner's trust provider instead. Based on a previously established linked relation between the trust providers, the group member's trust provider is able to forward the Get-Group request to the group owner's trust provider, as shown at step 209 in FIG. 2. However, the group member's trust provider uses its own credentials (instead of those of the group member) to authenticate the GetGroup request 209 that it forwards to the group owner's trust provider.

Step 210 in FIG. 2 is comparable to step 109 in FIG. 1 in that the cryptographic engine in the arrangement of the group owner's trust provider responds to receiving, through a secure transport mechanism (that used to communicate between trust providers), the GetGroup request 209. Said request contains one of the plurality of user identifiers previously received in the AddGroup request 203—that of the group member. The arrangement of the group owner's trust provider responds by transmitting the previously produced cryptoproduct, i.e. the digital crypto group, through the secure transport mechanism towards the group member's trust provider (see step 211 in FIG. 2).

The group member's trust provider does not need to become aware of any of the contents in the GetGroup response 211 it receives. Instead, it is sufficient to replace the authentication mechanisms that were used between the two trust providers with those used between the group member's trust provider and the group member. The correspondingly forwarded GetGroup response is shown as step 212 in FIG. 2. After receiving it and decrypting its contents, the user device of the group member is ready to engage in secure communications with the user device of the group owner, as shown in step 213 of FIG. 2.

One of the significant advantages associated with the methods and arrangements described above is the possibility to apply the practice of decentralized identifiers, commonly referred to as the DID. In order to establish trust relationships for digital communications, the trust provider may have different (public) cryptographic keys and sign-in information of the user for different purposes. One advantageous consequence thereof is the possibility of applying control on different levels. Another is the possibility of anonymous and/or pseudonymous appearance for the group members. Depending on the use case, the members of the group may appear anonymous even to each other or operate as pseudonyms, yet with full reliance upon the trust relationship(s) guaranteed by the trust provider. It is likewise possible that the members of the group can identify each other, while they remain unidentified to non-members.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An arrangement for establishing a digital crypto group, the arrangement comprising:
   a hardware-based cryptographic engine configured to produce cryptoproducts from given input data, and
   a secure transport mechanism with a receiving end and a transmitting end, the receiving end and the transmitting end of the secure transport mechanism coupled to said hardware-based cryptographic engine;
   wherein, in response to receiving through the secure transport mechanism, a first request containing a plurality of user identifiers, said hardware-based cryptographic engine is configured to generate and store a cryptoproduct; and
   wherein, in response to receiving through the secure transport mechanism a subsequent second request containing one of said plurality of user identifiers, the hardware-based cryptographic engine is configured to retrieve and transmit the stored cryptoproduct as generated, through the secure transport mechanism;
   wherein said cryptoproduct comprises a digital crypto group data structure containing:

the plurality of user identifiers:
   a common cryptographic key for use in symmetric cryptography between users identified by said plurality of user identifiers; and
   for each of the plurality of user identifiers, a corresponding user-specific public key for use in asymmetric cryptography in communications between users identified by said plurality of user identifiers; and
   wherein the arrangement is configured to check, whether said first request contained a respective user-specific public key for each of said plurality of user identifiers; and
   the arrangement is configured to respond to a finding that said first request did not contain a respective user-specific public key for each of said plurality of user identifiers by augmenting data received in said first request to contain a respective user-specific public key for each of said plurality of user identifiers.

2. The arrangement according to claim 1, wherein the arrangement is configured to perform said augmenting by requesting and receiving respective user-specific public keys from sources external to the arrangement.

3. The arrangement according to claim 1, wherein the arrangement is configured to check a piece of user-related information received in the first request against a corresponding piece of user-related information from another source, to find out whether the piece of user-related information received in the first request matches the corresponding piece of user-related information from another source.

4. The arrangement according to claim 3, wherein the arrangement is configured to respond to a finding that the piece of user-related information received in the first request and the corresponding piece of user-related information from another source do not match by making a decision about whether the establishing of the digital crypto group is allowed to continue.

5. The arrangement according to claim 1, wherein the arrangement is configured to use a signing key to digitally sign information elements it includes in said digital crypto group.

6. The arrangement according to claim 1, wherein the arrangement is configured to check from said subsequent second request whether the subsequent second request is destined to itself or to a further recipient, and respond to a finding that the subsequent second request is destined to a further recipient by forwarding said subsequent second request towards said further recipient.

7. The arrangement according to claim 6, wherein the arrangement is configured to, prior to said forwarding, replace an original authentication of said subsequent second request with an authentication of the arrangement itself.

8. A method for establishing a digital crypto group, the method comprising:
   receiving, through a secure transport mechanism, a first request containing a plurality of user identifiers,
   in response to receiving said first request, generating, by a hardware-based cryptographic engine, a cryptoproduct and storing the cryptoproduct,
   receiving, through said secure transport mechanism, a subsequent second request containing one of said plurality of user identifiers, and
   in response to receiving said subsequent second request, retrieving and transmitting said stored cryptoproduct as generated through said secure transport mechanism;
   wherein said cryptoproduct comprises a digital crypto group data structure that includes:

said plurality of user identifiers;

a common cryptographic key for use in symmetric cryptography between users identified by said plurality of user identifiers; and for each of the plurality of user identifiers, a corresponding user-specific public key for use in asymmetric cryptography in communications between users identified by said plurality of user identifiers; and wherein the arrangement is configured to check, whether said first request contained a respective user-specific public key for each of said plurality of user identifiers; and the arrangement is configured to respond to a finding that said first request did not contain a respective user-specific public key for each of said plurality of user identifiers by augmenting data received in said first request to contain a respective user-specific public key for each of said plurality of user identifiers.

9. The method according to claim 8, comprising:

in producing said digital crypto group, using a signing key to digitally sign information elements included in said digital crypto group.

10. The method according to claim 8, comprising:

checking from said subsequent second request whether the subsequent second request is destined to the arrangement executing the method or to a further recipient, and responding to a finding that the subsequent second request is destined to a further recipient by forwarding said subsequent second request towards said further recipient.

11. The method according to claim 10, comprising:

prior to said forwarding, replacing an original authentication of said subsequent second request with an authentication of the arrangement executing the method.

12. A computer program product comprising a non-transitory medium for storing one or more sets of one or more machine-executable instructions that are configured to, when executed by one or more processors, make said one or more processors execute a method comprising:

receiving, through a secure transport mechanism, a first request containing a plurality of user identifiers, in response to receiving said first request, generating, by a hardware-based cryptographic engine, a cryptoproduct and storing the cryptoproduct;

receiving, through said secure transport mechanism, a subsequent second request containing one of said plurality of user identifiers, and in response to receiving said subsequent second request, retrieving and transmitting said stored cryptoproduct as generated through said secure transport mechanism;

wherein said cryptoproduct is a digital crypto group data structure that includes:

said plurality of user identifiers;

a common cryptographic key for use in symmetric cryptography between users identified by said plurality of user identifiers, for each of the plurality of user identifiers, a corresponding user-specific public key for use in asymmetric cryptography in communications between users identified by said plurality of user identifiers; and wherein the arrangement is configured to check, whether said first request contained a respective user-specific public key for each of said plurality of user identifiers; and the arrangement is configured to respond to a finding that said first request did not contain a respective user-specific public key for each of said plurality of user identifiers by augmenting data received in said first request to contain a respective user-specific public key for each of said plurality of user identifiers.

13. The arrangement according to claim 1, wherein the arrangement comprises an electronic device including means for processing and communications and the hardware-based cryptographic engine is implemented by the means for processing.

14. The arrangement according to claim 1, wherein the arrangement comprises an electronic device implementing a vault or trusted party module comprising processing means for performing cryptographic operations and communications means for interfacing with a secure transport mechanism.

15. The arrangement according to claim 1, wherein the secure transport mechanism comprises a hardware-assisted communication interface configured to securely transmit and receive data between the cryptographic engine and one or more external entities.

16. The arrangement according to claim 1, wherein the apparatus comprises a non-transitory computer-readable medium storing a computer program product comprising machine-executable instructions that, when executed by one or more processors of the apparatus, cause the cryptographic engine to:

generate the cryptoproduct in response to the first request comprising the plurality of user identifiers; and transmit the cryptoproduct in response to the subsequent second request comprising one of the plurality of user identifiers.

17. The arrangement of claim 1, wherein said cryptoproduct comprises a data structure dynamically generated by the hardware-based cryptographic engine in response to said first request, the data structure including the plurality of user identifiers and, for each user identifier, a corresponding user-specific public key, the cryptoproduct being stored for subsequent retrieval and transmission through said secure transport mechanism responsive to said subsequent second request.

* * * * *